United States Patent Office 3,068,471
Patented Dec. 11, 1962

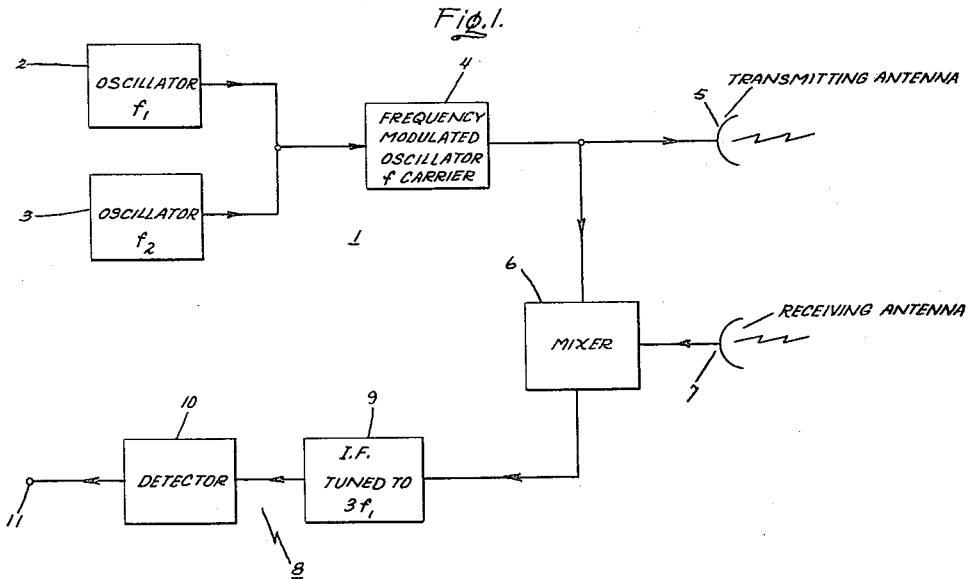
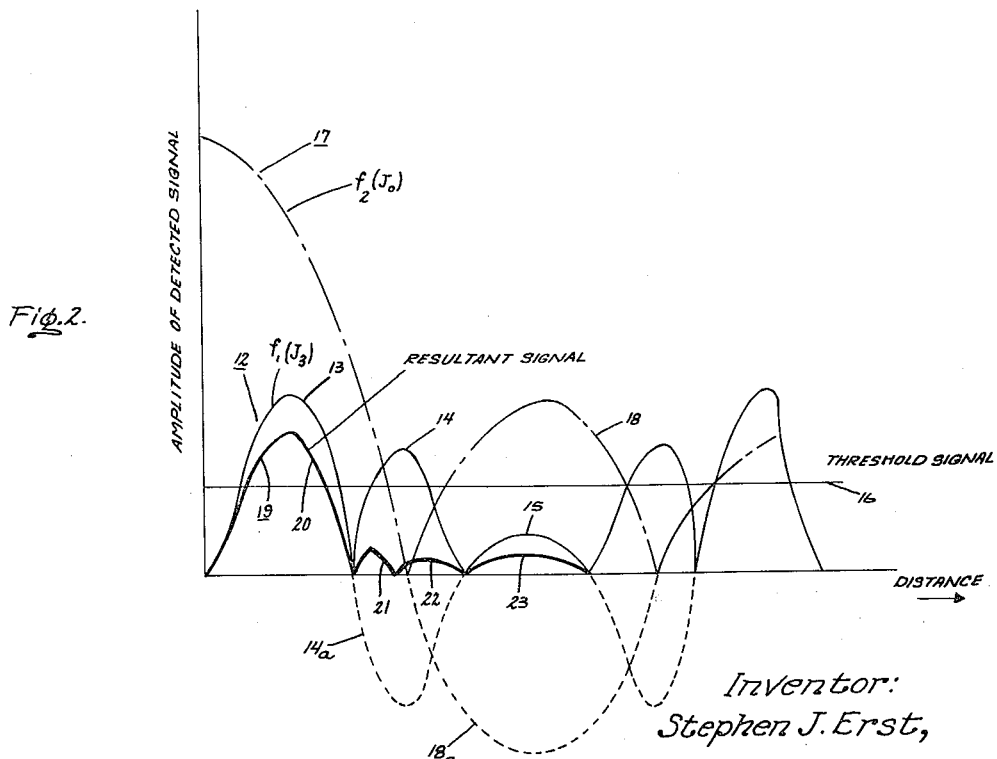

3,068,471
FREQUENCY MODULATED RADAR SYSTEM EMPLOYING TWO SINUSOIDAL MODULATING FREQUENCIES
Stephen J. Erst, New Haven, Ind., assignor to International Telephone and Telegraph Corporation
Filed Jan. 9, 1958, Ser. No. 708,044
8 Claims. (Cl. 343—14)

This invention relates to radar systems, and more particularly to a range-limited radar system.

Conventional radar systems provide range information, i.e., the instantaneous location of a distant object, throughout substantially the entire range of the equipment. In such conventional systems, a transmitted signal is reflected from a distant object and received by a local receiver, the transmitted signal generally initiating a sweep on a cathode ray viewing tube with the received signal being displayed on the tube, thus providing a continuous indication of the range of the distant object. There are, however, applications for radar systems in which it is desired to provide an output signal when the distant object is at a given range from the transmitting equipment and at no other time; such systems may be referred to as "range-limited." In prior systems of this type known to the applicant, which have been referred to as FM–CW systems, the transmitted signal is continuously frequency modulated by a single sinusoidal signal and a portion of the transmitted signal is mixed with the received signal. Analysis of the frequency components of the resulting signal output of the mixer by such means as Bessel functions reveals a third harmonic of the modulating frequency which provides a usable range-response characteristic. Thus, by tuning the I.F. stage of the receiver to the third harmonic of the modulating frequency, the resulting detected signal can be expressed as $$e_d = S|J_3(M)| \left| \cos \frac{2wD}{C} \right|$$

where:

$e_d$ is the detected signal
S is dependent on signal amplitude and system gain and represents the summation of the losses and gains in the system such as attenuation, target reflectivity, and propagation losses, etc.

$$M = 2B \sin \frac{uD}{C}$$

B is the modulation index
$u$ is $2\pi f_m$ where $f_m$ is the modulation frequency
D is the distance to the target
C is the velocity of propagation
$J_3(M)$ is the third order Bessel function of argument M $$\left| \cos \frac{2wD}{C} \right|$$

is the carrier doppler component
$w = 2\pi f$ carrier

It will be readily recognized that a plot of $J_3(M)$ against distance provides a signal, which, when detected, yields a range response characteristic having a first major peak at close range; this detected signal peak may then be utilized as an output signal.

Unfortunately, $J_3(M)$ also has a second peak of somewhat smaller magnitude than the first peak, which has been found in some instances to provide a false or premature indication; objects other than the intended object and at a distance from the equipment farther than the first peak may provide a second peak of sufficient amplitude to energize the circuitry connected to the output of the detector.

I have found that by the injection of a second non-synchronized sinusoidal modulating frequency of proper frequency magnitude, the unwanted response peak or peaks of the present system may be eliminated. Thus, in accordance with the broader aspects of my invention, the transmitted signal is continuously frequency modulated by two sinusoidal modulating frequencies, a portion of the transmitted signal mixed with the received signal, and the receiver tuned to pass the desired frequency component of the output of the mixer. In the specific embodiment of my invention, analysis of the frequency components of the outputs of the mixer reveals again a third harmonic of one of the modulating frequencies which includes in addition to the $J_3(M)$ function, a $J_0(M)$ function. Inspection of a plot of Bessel functions of the first kind readily reveals that by proper choosing of the two modulating frequencies, the unwanted second, and for that matter also the third, range response characteristic peaks of the prior system may be substantially reduced, leaving only a single major peak at close range. This system may therefore be referred to as a double FM–CW system.

It is therefore an object of this invention to provide an improved range-limited radar system.

Another object of this invention is to provide an improved range-limited radar system in which unwanted range response peaks are eliminated in the output signal.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a block diagram illustrating my improved range-limited radar system; and FIG. 2 is a plot of range response characteristics useful in complete understanding of my invention.

Referring now to FIG. 1, my improved range-limited radar system, generally identified as 1, comprises two oscillators 2 and 3 respectively providing continuous sinusoidal frequencies $f_1$ and $f_2$; the oscillators 2 and 3 may be of any conventional type and their specific circuitry does not form a part of this invention. Sinusoidal frequencies $f_1$ and $f_2$ provided by oscillators 2 and 3 are fed to frequency modulated oscillator 4 and thus continuously frequency modulate the carrier frequency. If the system 1 is operated in the microwave region, the frequency modulated oscillator 4 may conventionally be a Klystron tube. The output of the frequency modulated oscillator 4, which it is seen is a signal continuously and simultaneously frequency modulated by the two modulating frequencies $f_1$ and $f_2$, is then fed to transmitting antenna 5 which may be of any conventional type. A portion of the transmitted signal is fed to mixer 6, which may be of the type referred to as a "magic T," the received signal reflected from the distant object and picked up by receiving antenna 7 also being fed to the mixer 6. The output of the mixer 6 is fed to the receiver 8 which includes an I.F. (intermediate frequency) stage 9 tuned to the third harmonic of frequency $f_1$ provided by oscillator 2, and a detector 10; again, the specific circuitry of the I.F. stage 9 and detector 10 does not form a part of this invention and these system components may therefore be of any conventional type. Detector 10 is in turn connected to output terminal 11 to which other circuitry (not shown) which utilizes the output signal of this system is connected.

Frequency modulation with two frequencies in the general case causes generation of sidebands resulting from the harmonics of the individual modulating frequencies, as well as the sum and difference of those harmonics; the resulting frequency modulated signal may be expressed in the form $$A \sin (wt + B_1 \sin u_1 t + B_2 \sin (u_2 t + \theta_2))$$

where:

A is a constant,
$t$ is time,
$\theta_2$ is an angle denoting phase.

When a portion of the above signal is compared in mixer 6 with the signal returned from the distant object, the resulting signal may be expressed $$v = K \sin \gamma$$

where $\gamma$ is the phase difference of the transmitted and received signals.

This expression may be expanded in the form $$v = K \sin \left( \frac{-2wD}{C} + M_1 \sin \left( u_1 t - \frac{u_1 D}{C} \right) + M_2 \left( u_2 t - \frac{u_2 D}{C} + \theta \right) \right)$$

Expansion of this expression provides an indication of all the frequency components of the output mixer 6 and inspection of these many components indicates $$+ J_3(M_1) J_0(M_2) [\sin (\alpha + 3\psi) - \sin (\alpha - 3\psi)]$$

This expression reveals a third harmonic signal component which suffers no frequency change. Thus, tuning of the I.F. stage 9 to the third harmonic of the frequency $f_1$ provided by oscillator 2 and detecting that signal by detector 10 provides an output signal in the form $$e_d = |J_0(M_2)| S |J_3(M_1)| \left| \cos \frac{2wD}{C} \right|$$

It will now be readily seen that this equation is the equation of the output signal of the prior FM–CW system multiplied by $J_0(M_2)$.

Referring now to FIG. 2 in which the amplitude of the detected signal is plotted against distance, the response characteristic of the prior FM–CW system is shown by the curve 12 which includes a first major peak 13 and second and third peaks 14 and 15; it will be observed that the second peak 14 in the single FM–CW system is the negative peak 14a rectified. It will thus be seen that the peaks 13, 14a and 15 are that of the Bessel function of the first kind, third order, and of argument M. Horizontal line 16 in FIG. 2 represents the threshold signal of the utilization circuitry connected to the output terminal 11 of detector 10, i.e., the signal level which will initiate the desired operational sequence. It is seen that the second peak 14 of range response characteristic 12 is higher than the threshold signal level 16 and thus it is entirely possible that another object at a range greater than that of the first peak 13 will provide a response signal sufficient erroneously to initiate operation of the utilization circuitry.

The characteristics of $J_0(M_2)$ are known, being the Bessel function of the first kind, 0 order and argument $M_2$; this function begins with a magnitude of unity for $M_2$ (arguments) of 0 and continues in a diminishing cyclic fashion for increasing arguments. It will now be seen that by suitable design of the system, it can be arranged to cause $J_0(M_0) = 0$ when $J_3(M_1)$ is at a maximum for the second time. Reference again to FIG. 2 will now indicate that the curve 17, which represents the $J_0$ function, and thus the range response characteristic which represents the $J_0$ function, reaches 0 substantially at the midpoint of the peak 14 of the $J_3$ response characteristic 12. This curve 17 would by itself have a second peak 18 rectified from the negative peak 18a as shown. It is thus seen that both of the functions 12 and 17 of FIG. 2 are present in the output of mixer 6 and tuning of the I.F. stage 9 of receiver 8 to the third harmonic of the modulating frequency $f_1$ of oscillator 2 provides a resulting signal which is the product of these two components as represented by the curve 19 in heavy lines in FIG. 2. It will now be seen that this curve has a first major peak 20 substantially coextensive with the first peak 13 of the $J_3$ characteristic 12 but that its subsequent peaks 21, 22 and 23 are substantially reduced from the previous peaks 14 and 15 and that these peaks are of much smaller magnitude than threshold signal 16 and thus will not cause unwanted initiation of the operation of the utilization circuit connected to the output terminal 11 of detector 10.

It will now be seen that the $J_0$ curve 17 may be shifted substantially to reduce secondary peak 14 of $J_3$ characteristic 12 by the proper selection of the argument $M_2$. It will be recalled that $$M = 2B \sin \frac{uD}{C}$$

and thus $$M_2 = 2B \sin \frac{u_2 D_2}{C}$$

with $B_2$ being the modulation index of frequency 2, $u_2$ being $2\pi f_2$ and the distance and velocity of propagation functions instantaneously being constant. Thus, the $J_0$ curve 17 may be properly positioned with reference to the $J_3$ curve 12 by a suitable selection of the frequency $f_2$ and its amplitude. In an actual system in accordance with this invention for detecting the presence of distant objects at a range of approximately 1200 feet, it was found that the secondary peak 14 was adequately reduced by utilizing the frequency $f_1$ of 0.09 megacycle and a frequency $f_2$ of 0.02 megacycle.

It will now be readily seen that my improved system is not limited to the elimination of the second peak 14 in the $J_3$ characteristic, but that other sum or difference frequency components in the output of the mixer 6 may permit reduction of other unwanted range response characteristic peaks or accentuation of desired peaks; it is thus possible to provide a single range response characteristic peak appearing outwardly at a substantial distance from the base line of the characteristic curve of FIG. 2. Thus, since a detected signal equals $$|J_X(M_2)| S |J_Y(M_1)| \left| \cos \frac{2wD}{C} \right|$$

it will be seen that a wide range of possibilities is presented with selection of signals having two different Bessel function orders $x$ and $y$ respectively and then by suitable selection of the frequencies $f_1$ and $f_2$ and their respective amplitudes properly to proportion the arguments $M_2$ and $M_1$.

It will now be readily seen that I have provided an improved range-limited radar system in which by the addition of an additional modulating frequency and proper selection of that frequency and its amplitude, unwanted range response characteristic peaks resulting from the first frequency alone are substantially reduced.

While I have described above the principles of my invention in connection with specific apparatus, it is to be clearly understood that this description is made only by way of example and not as a limitation to the scope of my invention.

What is claimed is:

1. A range-limited radar system comprising: means for providing a signal frequency modulated by at least two separate sine wave frequencies; means for transmitting said frequency modulated signal; means for receiving said frequency modulated signal reflected from a distant object; means for comparing the transmitted and received frequency modulated signals; and detector means having its input circuit coupled to the output circuit of said comparing means by tuned circuit means tuned to pass a side band frequency of said transmitted frequency modulated signal.

2. A range-limited radar system comprising: a first source of sinusoidal signals having a first predetermined frequency; a second source of sinusoidal signals having a second predetermined frequency; means for simultaneously frequency modulating a carrier frequency with the signals from said first and second signal sources; means for transmitting the frequency modulated signal provided by said last-named means; means for receiving said frequency modulated signal reflected from a distant object; means for mixing the received frequency modulated signal and a portion of the transmitted frequency modulated signal; a tuned circuit coupled to the output circuit of said mixing means and tuned to pass one predetermined side band frequency of said transmitted frequency modulated signal; and detector means coupled to said tuned circuit.

3. A range-limited radar system comprising: a first source of sinusoidal signals having a first predetermined frequency; a second source of sinusoidal signals having a second predetermined frequency; means for simultaneously frequency modulating a carrier frequency with the signals from said first and second signal sources; means for transmitting the frequency modulated signal provided by said last-named means; means for receiving said frequency modulated signal reflected from a distant object; means for mixing the received signal and a portion of the transmitted signal; a tuned circuit tuned to a multiple of the frequency of one of said sources and coupled to the output circuit of said mixing means; and detector means coupled to said tuned circuit.

4. A range-limited radar system comprising: a first source of sinusoidal signals having a first predetermined frequency; a second source of sinusoidal signals having a second predetermined frequency; means for simultaneously frequency modulating a carrier frequency with the signals from said first and second signal sources; means for transmitting the frequency modulated signal provided by said last-named means; means for receiving said frequency modulated signal reflected from a distant object; means for mixing the received signal and a portion of the transmitted signal; a tuned circuit tuned to the third harmonic of the frequency of one of said sources and coupled to the output circuit of said mixing means; and detector means coupled to said tuned circuit.

5. A radar system comprising: a first cource of sinusoidal signals having a first predetermined frequency; a second source of sinusoidal signals having a second predetermined frequency; means for simultaneously frequency modulating a carrier frequency with the signals from said first and second signal sources; means for transmitting the frequency modulated signal provided by said last-named means; means for receiving said frequency modulated signal reflected from a distant object; means for mixing the received signal and a portion of the transmitted signal; and receiver means comprising an intermediate frequency circuit tuned to a multiple of the frequency of said first source and coupled to the output circuit of said mixing means; and detector means coupled to said I.F. circuit; said second source providing signals having a frequency and amplitude such that said receiver means has a range response characteristic having only one major peak.

6. A radar system comprising: a first source of sinusoidal signals having a first predetermined frequency; a second source of sinusoidal signals having a predetermined frequency; means for simultaneously frequency modulating a carrier frequency with the signals from said first and second signal sources; means for transmitting the frequency modulated signal provided by said last-named means; means for receiving said frequency modulated signal reflected from a distant object; means for mixing the received signal and a portion of the transmitted signal; and receiver means comprising an intermediate frequency circuit tuned to the third harmonic of the frequency of said first source and coupled to the output circuit of said mixing means, and detector means coupled to said I.F. circuit; said second source providing signals having a frequency and amplitude such that said receiver means has a range response characteristic with only one major peak at close range.

7. A radar system comprising: a first source of sinusoidal signals having a first predetermined frequency; a second source of sinusoidal signals having a second predetermined frequency; means for simultaneously frequency modulating a carrier frequency with the signals from said first and second signal sources; means for transmitting the frequency modulated signal provided by said last-named means; means for receiving said frequency modulated signal reflected from a distant object; means for mixing the received signal and a portion of the transmitted signal; and receiver means comprising a tuned intermediate frequency circuit coupled to the output of said mixing means, and detector means coupled to said I.F. circuit; said intermediate frequency circuit being tuned to one side band of said transmitted frequency modulated signal so that the output signal of said detector means is $$e_1 = |J_x(M_2)| S |J_y(M_1)| \left|\cos \frac{2wD}{C}\right|$$

$J_x(M_2)$ is the Bessel function of the first kind, $x$ order and argument $M_2$ S is a constant dependent upon signal amplitude and system gain representing the summation of losses and gains including attenuation, target reflectivity and propagation losses $J_y(M_1)$ is the Bessel function of the first kind $y$ order and argument $M_1$ $$M_2 = 2B_2 \sin \frac{\mu_2 D}{C}$$

$B_2$ is the modulation index of said second source of sinusoidal signals $\mu_2 = 2\pi f_2$ $f_2$ is the frequency of said second source of sinusoidal signals D is the distance to said distant object C is the velocity of propagation $$M_1 = 2B_1 \sin \frac{\mu_1 D}{C}$$

$B_1$ is the modulation index of said first source of sinusoidal signals $\mu_1 = 2\pi f_1$ $f_1 =$ the frequency of said first source of sinusoidal signals $x$ is the number of one side band of said transmitted frequency modulated signal $y$ is the number of another side band of said transmitted frequency modulated signal $$\cos \frac{2wD}{C}$$

is the doppler frequency component $w = 2\pi f_C$ $f_C =$ said carrier frequency said second source providing signals having a frequency and amplitude so that $M_2$ is such that undesired peaks in the range response characteristic of said receiver means which would result from said first predetermined frequency alone are substantially reduced.

8. A radar system comprising: a first source of sinusoidal signals having a first predetermined frequency; a second source of sinusoidal signals having a second predetermined frequency; means for simultaneously frequency modulating a carrier frequency with the signals from said first and second signal sources; means for transmitting the frequency modulated signal provided by said last-named means; means for receiving said frequency modulated signal reflected from a distant object; means for mixing the received signal and a portion of the transmitted signal; and receiver means comprising a tuned intermediate frequency circuit coupled to the output of said mixing means; and detector means coupled to said I.F. circuit; said intermediate frequency circuit being tuned to the third harmonic of said first predetermined frequency whereby the output signal of said detector means is $$e_d = |J_0(M_2)|S|J_3(M_1)|\cos\frac{2wD}{C}$$

where:

$J_0(M_2)$ is the Bessel function of the first kind, 0 order and argument $M_2$

S is a constant dependent upon signal amplitude and system gain representing the summation of losses and gains including attenuation, target reflectivity and propagation losses $J_3(M_1)$ is the Bessel function of the first kind, third order and argument $M_1$ $$M_2 = 2B_2 \sin\frac{\mu_2 D}{C}$$

$B_2$ is the modulation index of said second source of sinusoidal signals $\mu_2 = 2\pi f_2$ $f_2$ is the frequency of said second source of sinusoidal signals D is the distance to said distant object C is the velocity of propagation $$M_1 = 2B_1 \sin\frac{\mu_1 D}{C}$$

$B_1$ is the modulation index of said first source of sinusoidal signals $\mu_1 = 2\pi f_1$ $f_1$ = the frequency of said first source of sinusoidal signals 0 is the carrier component of said transmitted frequency modulated signal 3 is the third side band of said transmitted frequency modulated signal $$\cos\frac{2wD}{C}$$

is the doppler frequency component $w = 2\pi f_C$ $f_C$ = said carrier frequency said second source providing signals having a frequency and amplitude so that $M_2$ is such that all peaks beyond the first peak in the range response characteristic of said receiver means which would result from said first predetermined frequency alone are substantially reduced.

References Cited in the file of this patent

UNITED STATES PATENTS

| | | |
|---|---|---|
| 2,222,587 | Sanders | Nov. 19, 1940 |
| 2,602,920 | Rust et al. | July 8, 1952 |
| 2,641,754 | Clegg | June 9, 1953 |

UNITED STATES PATENT OFFICE
CERTIFICATE OF CORRECTION

Patent No. 3,068,471 December 11, 1962

Stephen J. Erst

It is hereby certified that error appears in the above numbered patent requiring correction and that the said Letters Patent should read as corrected below.

Column 6, line 31, before "$J_x(M_2)$" insert -- where --.

Signed and sealed this 28th day of May 1963.

(SEAL)
Attest:

ERNEST W. SWIDER
Attesting Officer

DAVID L. LADD
Commissioner of Patents